United States Patent
Mineo

[19]

[11] Patent Number: 5,983,631
[45] Date of Patent: Nov. 16, 1999

[54] EXHAUST CONTROL FOR WATERCRAFT ENGINE

[75] Inventor: Shigeharu Mineo, Iwata, Japan

[73] Assignee: Yamaha Hatsudoki Kabushiki Kaisha, Shizuoka-ken, Japan

[21] Appl. No.: 08/844,543

[22] Filed: Apr. 18, 1997

[30] Foreign Application Priority Data

Apr. 18, 1996 [JP] Japan .................................. 8-097161

[51] Int. Cl.⁶ ...................................................... F01N 3/10
[52] U.S. Cl. ................ 60/299; 60/322; 440/89
[58] Field of Search ............................. 60/299, 302, 312, 60/313, 314, 322, 323; 440/89

[56] References Cited

U.S. PATENT DOCUMENTS 5,490,474  2/1996  Ikeda .
5,511,505  4/1996  Kobayashi et al. .
5,524,597  6/1996  Hiki et al. .

*Primary Examiner*—Thomas E. Denion
*Attorney, Agent, or Firm*—Knobbe, Martens, Olson & Bear LLP

[57] ABSTRACT

An exhaust control for an internal combustion engine powering a watercraft is disclosed. The exhaust control includes an exhaust manifold connected to the engine and having a passage therethrough leading from an exhaust passage extending from a combustion chamber within the engine. An exhaust pipe, preferably in the form of an expansion pipe, extends from the exhaust manifold for leading the exhaust to a discharge. The exhaust pipe is connected to the engine, preferably with a number of brackets. A catalyst is positioned within the portion of the exhaust pipe which is connected to the engine. In a preferred arrangement the manifold extends towards the front end of the engine and the expansion pipe extends therefrom towards the rear of the engine through a valley formed by the engine and an induction system thereof.

11 Claims, 9 Drawing Sheets

EXHAUST CONTROL FOR WATERCRAFT ENGINE

FIELD OF THE INVENTION

The present invention relates to an exhaust control. More particularly, the invention is an exhaust control for an engine of the type powering a personal watercraft.

BACKGROUND OF THE INVENTION

Watercraft, including personal watercraft, are often powered by an internal combustion engine having an output shaft arranged to drive a water propulsion device. The engines which are used to power personal watercraft are most often of the two-cycle variety. These engines generate a large amount of hydrocarbon exhaust.

Unfortunately, when this exhaust is exhausted from the watercraft, it may react with the water in which the watercraft is located and form acids and other undesirable compounds, and may also be released from the water into the atmosphere.

The use of catalytic converters is known for use in oxidizing carbon monoxide and hydrocarbons into carbon dioxide and water, and reducing oxides of nitrogen into nitrogen. While the use of a catalytic converter is desirable with these types of engines, several problems generally arise with their use with engines powering personal watercraft.

First, the catalyst is typically positioned in an exhaust pipe leading from the engine. In personal watercraft, this exhaust pipe leads through a chamber in the hull of the craft to an outlet near the stern. This arrangement causes the exhaust pipe to be susceptible to vibration which may cause damage to the honeycomb structure of the catalyst.

In addition, in personal watercraft the amount of space in which the engine may be positioned is limited so as to maintain the craft small in dimension and with a low center of gravity. The catalyst must also not be place too near the engine or it will overheat, and must not be place to far from the engine or it may be susceptible to the condensation of liquids and the entry of water backwardly through the exhaust system.

An exhaust control for an engine of the type utilized to power a watercraft which is includes a catalyst and which overcomes the above-stated problems, is desired.

SUMMARY OF THE INVENTION

In accordance with the present invention there is provided an exhaust control for an engine powering a watercraft having a hull. The exhaust control is adapted for use with an internal combustion engine having at least one combustion chamber with an exhaust passage leading therefrom for routing exhaust from the combustion chamber.

The exhaust control includes an exhaust manifold connected to the engine and having a passage therein leading from the exhaust passage. An exhaust pipe is connected to the exhaust manifold and directs exhaust for the manifold to an exhaust gas discharge.

In accordance with the present invention, the exhaust pipe is also preferably directly connected to the engine. In addition, the exhaust control includes a catalyst positioned in the exhaust pipe. The catalyst is positioned in the exhaust pipe at or adjacent that port of the pipe which is connected to the engine, whereby vibration of the catalyst is reduced.

In the preferred arrangement, the exhaust pipe comprises an expansion pipe or similar enlarged pipe section, which pipe section then leads to a smaller exhaust pipe portion. In this arrangement, the expansion pipe is connected to the engine and the catalyst is positioned in the expansion pipe.

Preferably, the portion of the exhaust or expansion pipe in which the catalyst is positioned in connected to the cylinder block of the engine with a pair of lower brackets, and to a cylinder head cover with a pair of upper brackets.

The exhaust control may also include a valve positioned within the exhaust passage leading from the combustion chamber for controlling the flow of exhaust from each combustion chamber through the passage to the manifold.

Preferably, the exhaust manifold extends towards the front end of the engine, and the expansion pipe leads therefrom along the engine to the rear end thereof. In this manner, the exhaust passage length from the engine to the catalyst is sufficiently long.

In one arrangement, each combustion chamber of the engine has a centerline which is offset from a vertical line and the engine includes an intake system which extends from the engine in a direction on the opposite side of the vertical line from the centerline(s). In this arrangement, the engine, including the induction system, has a "V"-shaped valley in which the expansion pipe is positioned. This permits the height profile of the engine to remain small.

In another arrangement, the exhaust manifold is connected to the side of the engine closest the vertical line and the expansion pipe extends generally under the engine between the centerline(s) and a bottom of the hull of the watercraft.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an exhaust control for an engine of the type utilized to power a watercraft, and more particularly, a personal watercraft.

Figure 1:
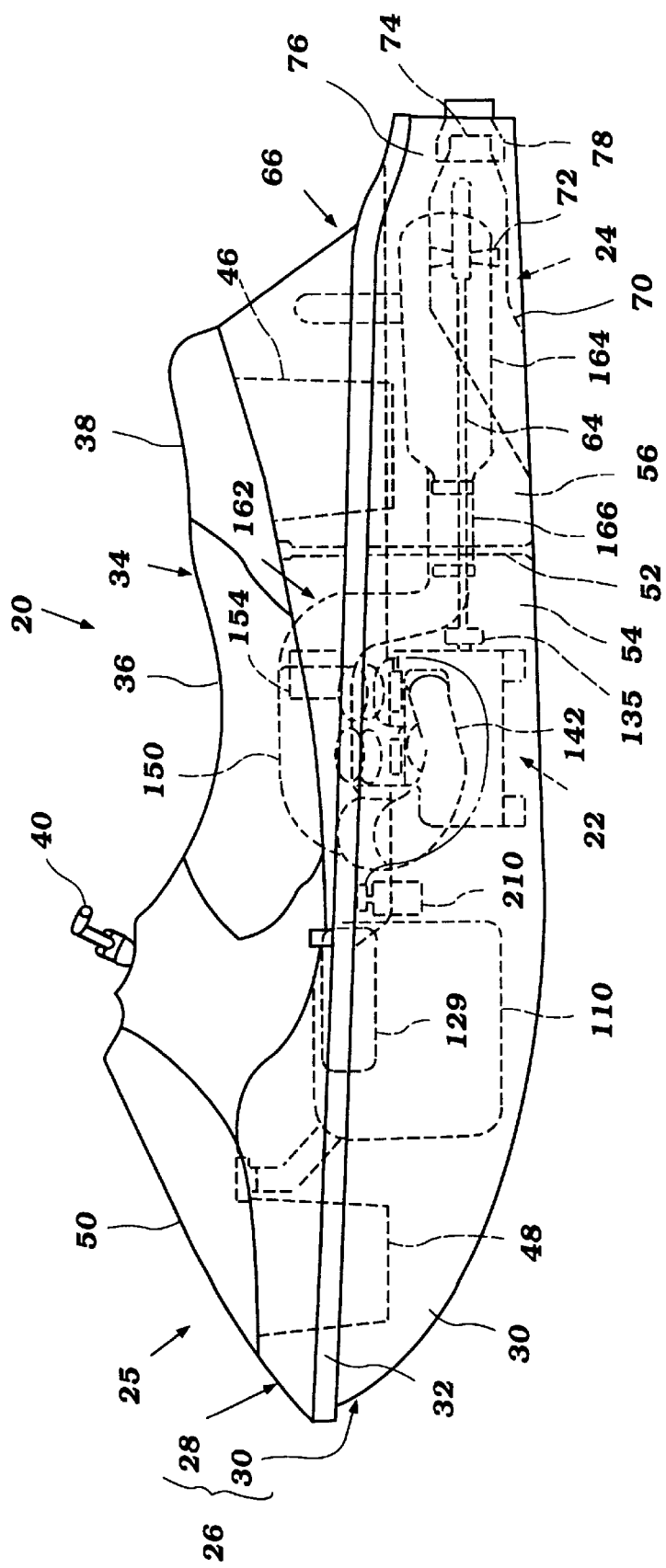
FIG. 1 is a side view of a personal watercraft of the type powered by an engine having an exhaust control in accordance with the present invention, the engine and other watercraft components positioned within the watercraft illustrated in phantom.
Figure 2:
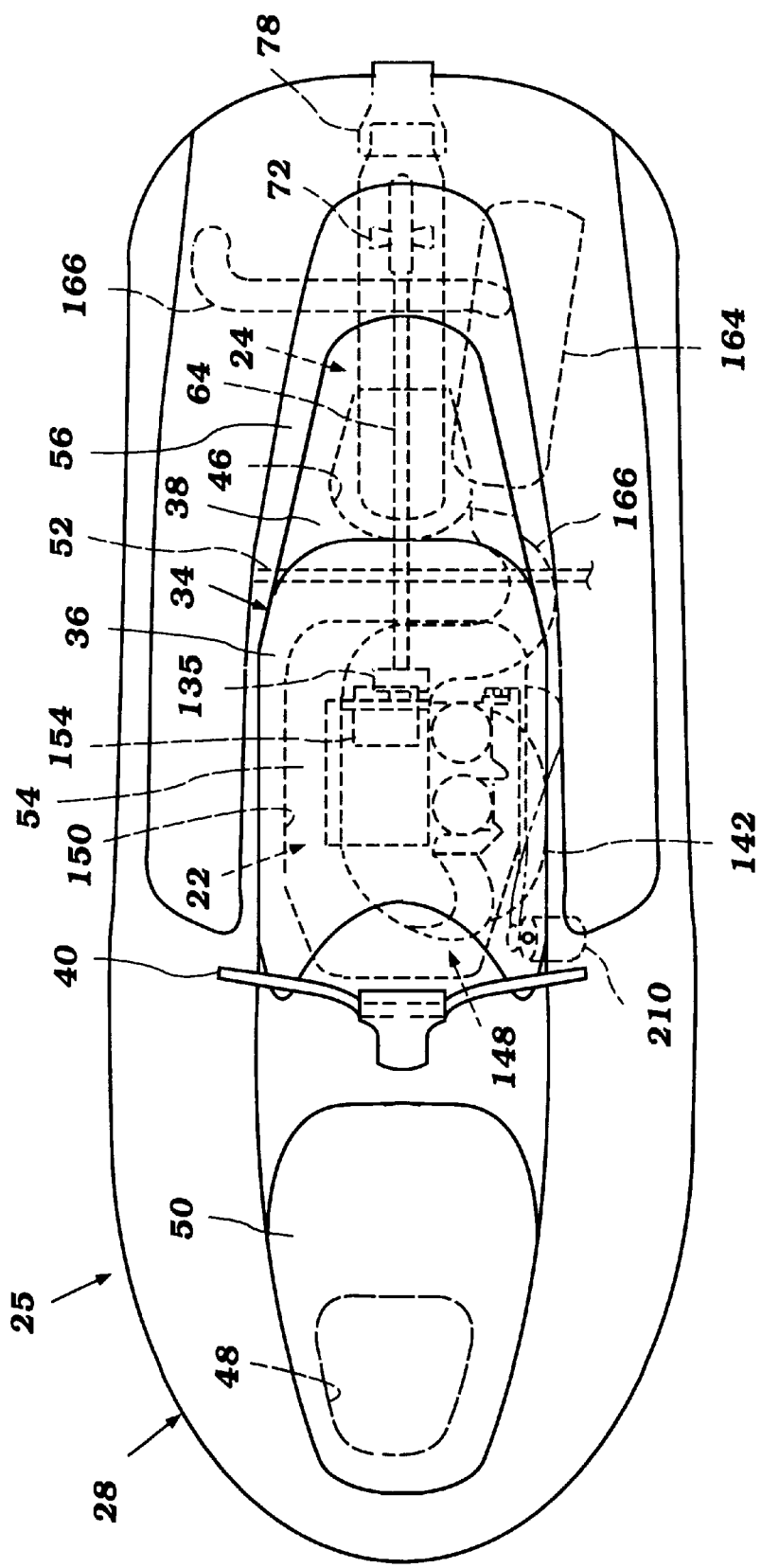
FIG. 2 is a top view of the watercraft illustrated in FIG. 1, with the engine and other watercraft components positioned within the watercraft illustrated in phantom.

FIGS. 1 and 2 illustrate a watercraft 20 having a watercraft body 25 comprising a hull 26 having a top portion or deck 28 and a lower portion 30. A gunnel 32 defines the intersection of the hull 26 and the deck 28.

A seat 34 comprising a front seat 36 and a rear seat 38 is positioned on the top portion 28 of the hull 26. The front seat 36 is preferably connected to a first removable deck member. The rear seat 38 is preferably connected to a second removable deck member. A steering handle 40 is provided adjacent the front seat 32 for use by a user in directing the watercraft 20.

Figure 3:
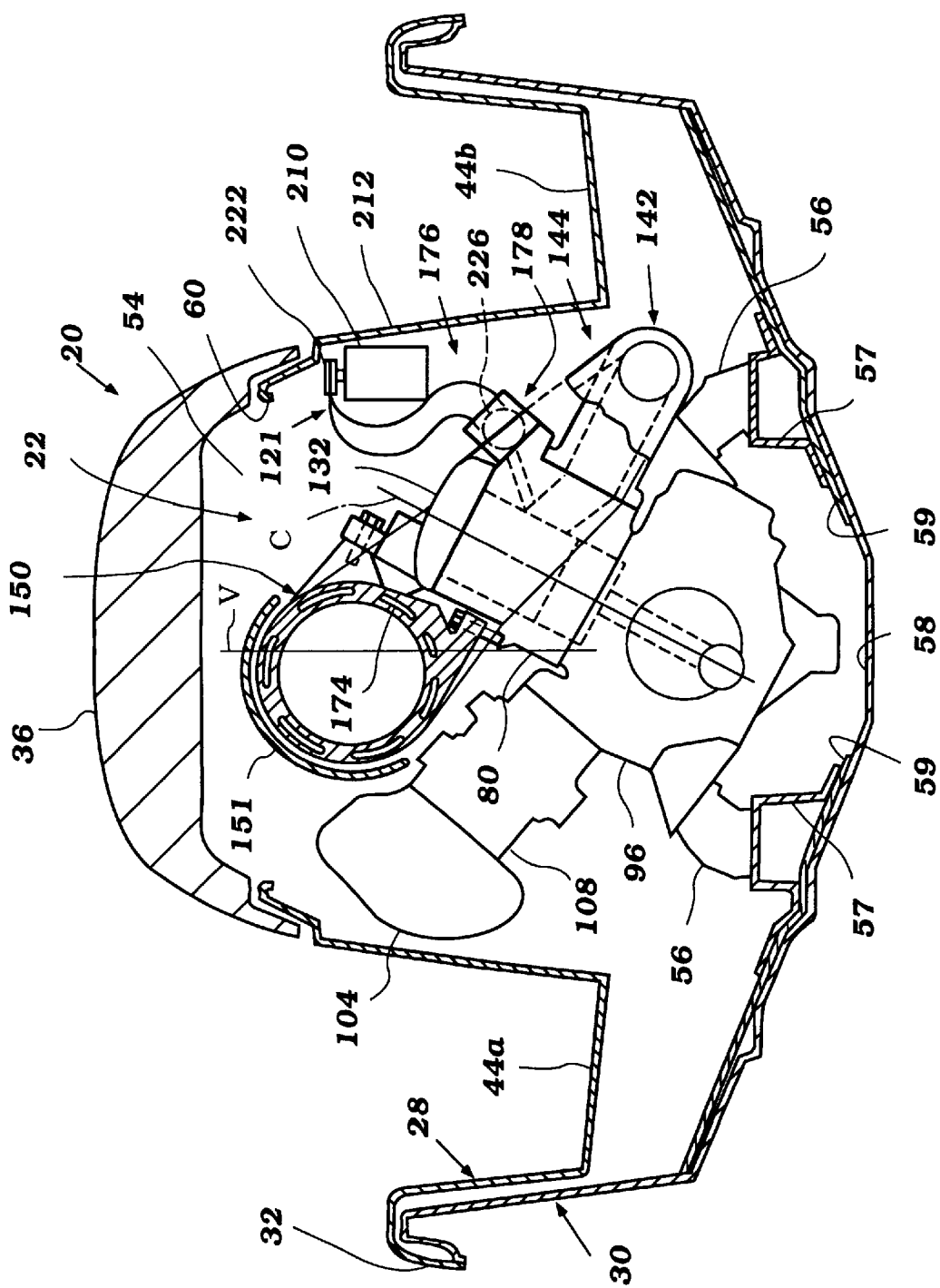
FIG. 3 is a cross-sectional end view of the watercraft illustrated in FIG. 1, illustrating the engine therein and a portion of the exhaust system in cross-section.

As best illustrated in FIG. 3, a bulwark extends upwardly along each side of the watercraft 20. A foot step area 44a,b is defined between each seat 36,38 and its adjacent bulwark.

As illustrated in FIGS. 1 and 2, the watercraft 20 includes a pair of storage boxes 46,48. A rear storage box 46 is preferably positioned underneath the rear seat 38 and is accessible by removing the second removable deck member. The front storage box 48 is preferably a recessed area in the top or deck portion 28 of the hull 26 at the bow of the craft, and includes a cover or hatch 50 selectively extendible over the storage box 48 for protecting the items therein from water and the like.

The top and bottom portions 28,30 of the hull 26, along with a bulkhead 52, define an engine compartment 54 and a pumping chamber 56. The engine 22 is positioned in the engine compartment 54. As best illustrated in FIG. 3, the engine 22 is connected to the hull 26 via several engine mounts 56 connected to a bottom 58 of the lower portion 30 of the hull 26. The mounts 56 are connected to upwardly extending supports 57 which are connected to reinforced sections 59 of the bottom 58 of the lower portion 30 of the hull 26. The engine 22 is preferably at least partially accessible through a maintenance opening 60 accessible by removing the first removable deck member on which the front seat 36 is mounted.

The engine 22 has a crankshaft 62 (see FIG. 6) which is in driving relation with an impeller shaft 64 (see FIG. 1). The impeller shaft 64 rotationally drives a means for propelling water of a propulsion unit 24, which unit extends out a stern portion 66 of the watercraft 20.

The propulsion unit 24 includes a propulsion passage 70 having an intake port which extends through the lower portion 30 of the hull 28. The means for propelling water, preferably an impeller 72 driven by the impeller shaft 64, is positioned in the passage 70. The passage 70 also has an outlet 74 mounted within a chamber 76 with its discharge positioned within a nozzle 78. The nozzle 78 is mounted for movement up and down and to the left and right, whereby the direction of the propulsion force for the watercraft 20 may be varied.

Figure 4:
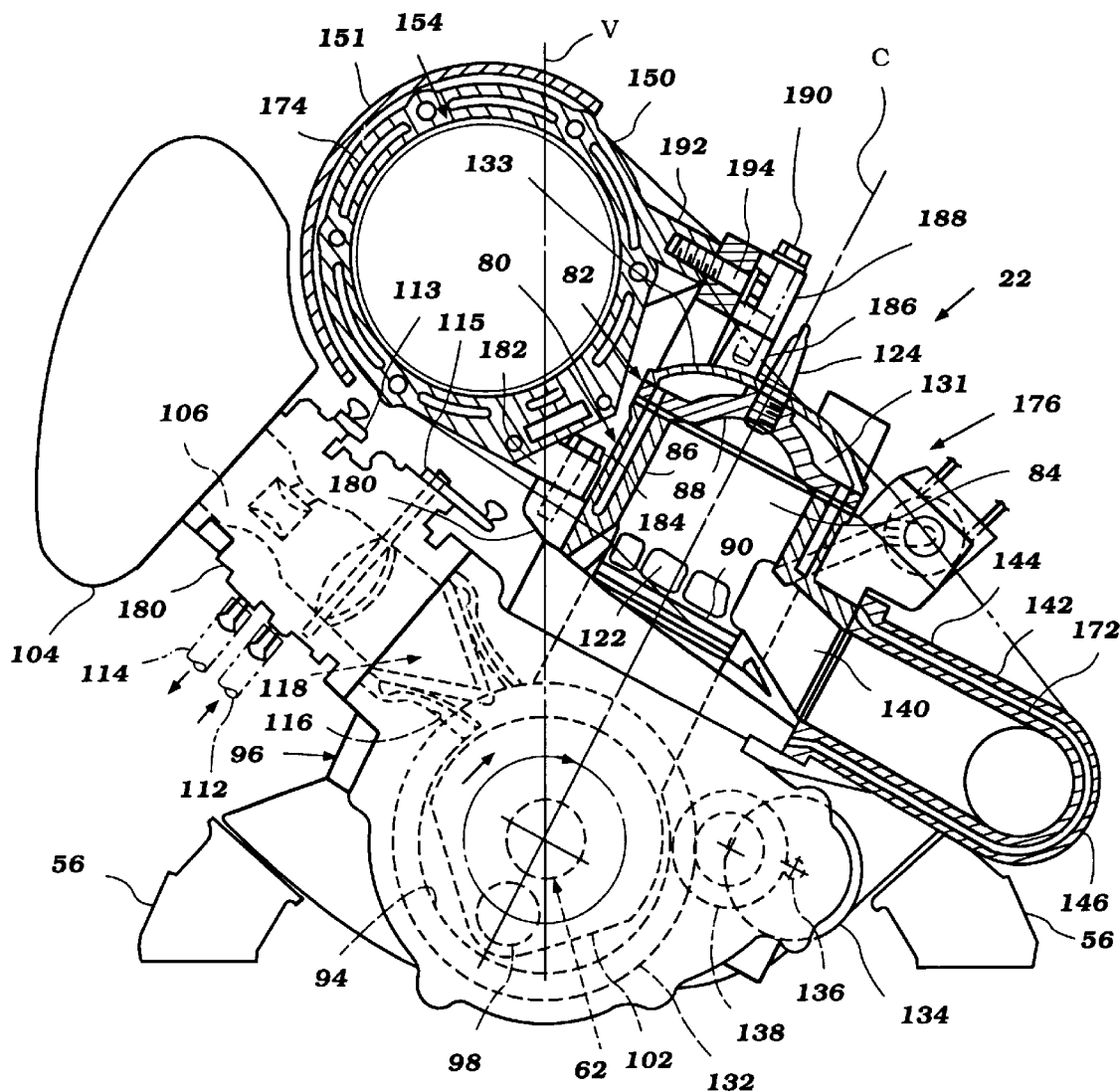
FIG. 4 is a cross-sectional end view of the engine illustrated in FIG. 3.
Figure 5:
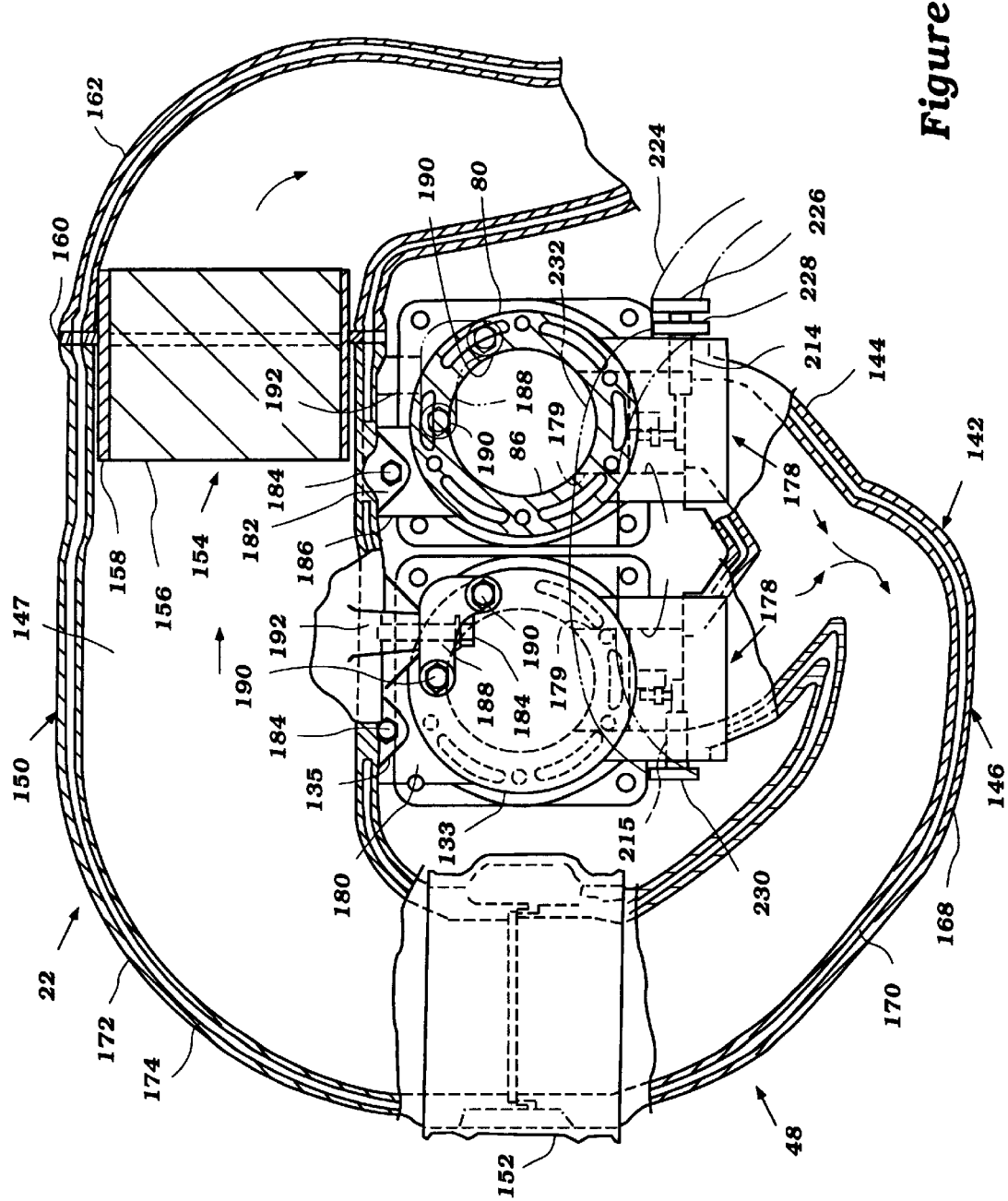
FIG. 5 is a cross-sectional top view of the engine illustrated in FIG. 3.

The engine 22 is best illustrated in FIGS. 3–5. As illustrated therein, the engine 22 is preferably of the two-cylinder, two-cycle variety. Of course, the engine 22 may have as few as one, or more than two, cylinders, as may be appreciated by one skilled in the art.

The engine 22 includes a cylinder block 80 having a cylinder head 82 connected thereto and cooperating therewith to define two combustion chambers 84 defined by cylinder walls 86 within the block 80 and a recessed area 88 in the cylinder head 82. A piston 90 is movably mounted in each combustion chamber, and connected to the crankshaft 62 via a connecting rod 92, as is well known in the art. Preferably, the engine 22 is tilted so that the combustion chambers 84 have a centerline C which is offset from a vertical axis V. As is well known in the art, this arrangement keeps the vertical profile of the engine small, such that the watercraft 20 has a low center of gravity.

The crankshaft 62 is rotatably journalled by a number of sealed bearings 100 with respect to the cylinder block 80 within a crankcase chamber 94. Preferably, the chamber 84 is defined by a crankcase cover member 96 which extends from a bottom portion of the cylinder block 80. The crankshaft 62 has pin portions 98 extending between web portions 102, with each connecting rod 92 connected to one of the pin portions 98.

As best illustrated in FIG. 4, the engine 22 includes means for providing an air and fuel mixture to each combustion chamber 84. Preferably, air is drawn into the engine compartment 54 through one or more air inlets in the hull 26. Air is then drawn into a silencer 104 and delivered to a venturi passage 106 in a carburetor 108.

Fuel is provided to the incoming air. In particular, fuel is drawn from a fuel tank 110 (see FIG. 1) positioned in the engine compartment 54, by a fuel pump (not shown), and delivered through a fuel delivery line 112 to the carburetor 108. A throttle and choke control (not shown) is preferably provided for allowing the watercraft operator to control the rate of fuel and air delivery to the engine 22 for controlling the speed and power output of the engine via a throttle linkage 113 and choke linkage 115 of the carburetor 108, as illustrated in FIG. 4. Fuel which is delivered to the carburetor 108 but not delivered to the air flowing therethrough may be returned to the fuel tank 110 through a return line 114.

It is contemplated that the fuel may be provided by indirect or direct fuel injection, as well as via carburation, as known in the art.

The air and fuel mixture selectively passes through an intake port 116 into the crankcase chamber 94 as controlled by a reed valve 118, as is known in the art. As is also well known, an intake port 116 and corresponding reed valve 118 are preferably provided corresponding to each combustion chamber 84. The crankcase chamber 94 is compartmentalized so as to provide the crankcase compression feature for each combustion chamber as is well known in the operation of two-cycle engines.

The fuel and air charge within the crankcase chamber 94 is delivered to each combustion chamber 84 through a scavenge passage 120 leading to a number of scavenge ports 122 in the cylinder wall 86.

A suitable ignition system is provided for igniting the air and fuel mixture provided to each combustion chamber. Preferably, this system comprises a spark plug 124 (see FIG. 4) corresponding to each combustion chamber. The spark plugs are preferably fired by a suitable ignition system.

Figure 6:
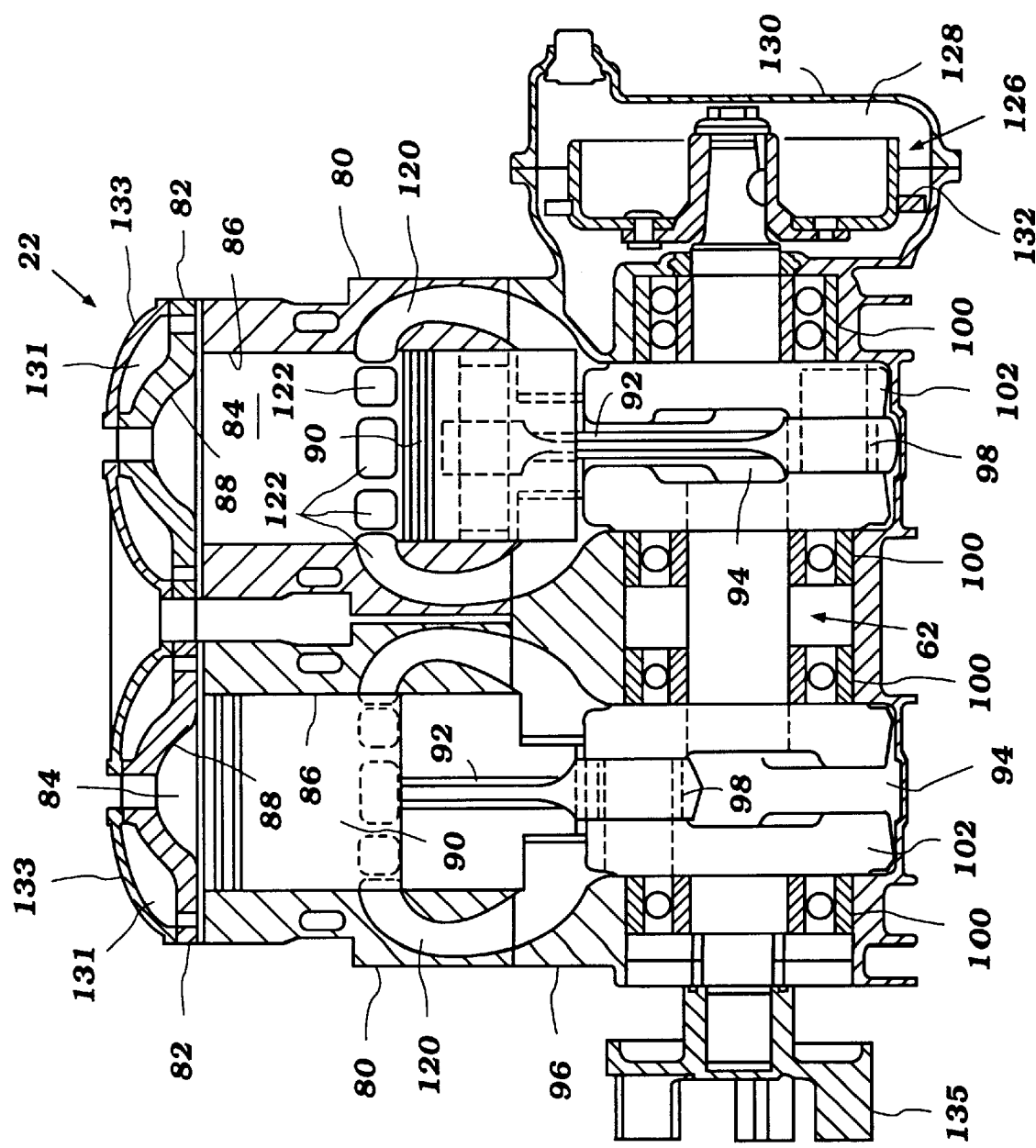
FIG. 6 is a cross-sectional side view of the engine illustrated in FIG. 3.

As illustrated in FIG. 6, a flywheel 126 is connected to one end of the crankshaft 62 within a chamber 128 defined by the crankcase cover 96 and a cover 130. The flywheel 126 preferably has a number of magnets thereon for use in a pulser-coil arrangement for generating firing signals for the ignition system. In addition, the ignition system may include a battery for use in providing power to an electric starter (described below) and other electrical features.

A number of teeth 132 are mounted on the periphery of the flywheel 126 for use in starting the engine 22 with a starter motor 134. In particular, as illustrated in FIG. 4, the starter motor 134 is positioned near the bottom 58 of the hull 26. The starter motor 134 drives a drive gear 136. The drive gear 136 turns an intermediate gear 138 positioned between the drive gear and the flywheel 126.

The engine 22 includes a lubricating system for providing lubricating oil to the various moving parts thereof.

Preferably, the lubricating system includes an oil tank or reservoir 129 (see FIG. 1) from which lubricating oil is delivered to and circulated throughout the engine, as is well known to those skilled in the art.

The engine 22 also preferably includes a suitable cooling system. Preferably, the cooling system is a liquid cooling system which draws cooling water from the body of water in which the watercraft 20 is being operated and circulates it through various cooling water jackets 131 in the cylinder block 80, head 8, and between the cylinder head 82 and a head cover 133 (see FIGS. 4–7). The cover 133 may be connected to the cylinder head 82 via a number of bolts 135 (see FIG. 5).

As stated above, the crankshaft 62 drives the impeller 72 of the propulsion unit 24. Referring to FIG. 1, the end of the crankshaft 62 extends through the crankcase cover to a coupling 135 where it is coupled to an end of the impeller shaft 64. The coupling 135 is arranged so that the crankshaft 62 and impeller shaft 64 may be removable coupled to one another.

As best illustrated in FIG. 5, exhaust gas generated by the engine 22 is routed from the engine to a point external to the watercraft 20 by an exhaust system which includes an exhaust passage 140 leading from each combustion chamber 84 through the cylinder block 80. An exhaust manifold 142 is connected to a side of the engine 22. The manifold 142 has a pair of branches 144 with passages leading therethrough, the passages aligned with the passages 142 leading through the cylinder head 82. Exhaust generated by each combustion chamber is routed through the passage 140 to the manifold 142.

The branches 144 of the manifold 142 merge at a merge pipe portion 146 of the manifold which curves around the front end of the engine 22. The merge pipe portion 146 has a passage 148 through which the exhaust is routed.

An exhaust pipe extends from the manifold 142. Preferably, the portion of the exhaust pipe connected to the manifold 142 comprises an expansion pipe 150. The expansion pipe 150 is connected to the exhaust manifold 142, preferably via a flexible sleeve 152. The expansion pipe 150 has an enlarged passage 147 or chamber (as generally compared to the passage(s) through the remainder of the exhaust system) through which exhaust routed from the passage 148 in the exhaust manifold flows. As best illustrated in FIGS. 3 and 4, a protective plate 151 may be positioned over the top surface of the expansion pipe 150 for preventing the operator from touching the hot pipe 150 when reaching into the engine compartment 54.

Referring again to FIG. 5, a catalyst 154 is positioned within the expansion pipe 150. The catalyst 154 preferably comprises a flow-through honeycomb-type catalyst bed portion 156 mounted within a housing 158 and connected to the expansion pipe 150 via a flange 160. The housing 150 is a generally cylindrical member having its first and second ends aligned with the flow path through the passage. The bed portion 156 of the catalyst is arranged in the housing 150 so that the exhaust flows therethrough.

After flowing through the catalyst 154, the exhaust flows into an upper exhaust pipe section 162 of the exhaust system. This portion of the exhaust system is tapers to a smaller diameter from that of the expansion pipe 150. As illustrated in FIG. 1, this exhaust pipe 162 leads to a water lock 164. The exhaust pipe 162 is preferably connected to the water lock 164 via a flexible fitting, such as a rubber sleeve 166. The exhaust flows through the water lock 164, which is preferably arranged as known to those skilled in the art, and then passes to a lower exhaust pipe 166 which has its terminus in the chamber 76. In this manner, exhaust flows from the engine 22 through the exhaust system to its discharge within the water flowing through the chamber 76.

As a portion of the cooling system, and as best illustrated in FIG. 5, a cooling jacket is preferably provided for cooling the exhaust system. As illustrated, a sleeve 168 preferably extends around the exhaust manifold 144, cooperating with the manifold to create a cooling jacket 170. A similar sleeve 172 preferably extends around the expansion pipe 150, including the exhaust pipe section 162, cooperating therewith to form a cooling jacket 174. Preferably, the cooling jackets 172,174 are in fluid communication through the sleeve 152, whereby coolant introduced into the jacket 172 may flow to jacket 174 and on to a coolant discharge.

In accordance with the present invention, the portion of the exhaust system in which the catalyst 154 is positioned is connected securely to the engine 22 for reducing the transmission of vibrations to the catalyst 154. Thus, in the preferred embodiment, the expansion pipe 150 is connected to the engine 22 for supporting it across the top of the engine, as illustrated in FIG. 4. As illustrated, a lower boss 180 extends outwardly (opposite the exhaust manifold 144) from the cylinder block 80. A lower flange or bracket 182 extends from the expansion pipe 150 and is connected to the lower boss 180 via a bolt 184.

Similarly, an upper boss 186 extends upwardly from the cover 133. A bracket 188 is connected to the boss via bolts 190. An upper bracket 192 extends from the expansion pipe 150 (above the lower bracket) and is connected to the bracket 188 via a bolt 194. Preferably, as illustrated in FIG. 5, the expansion pipe 150 is connected between its ends to the engine 22 via a pair of these upper and lower mountings.

This arrangement has several advantages. First, the portion of the exhaust system in which the catalyst 154 is mounted is fixed so as to prevent significant vibration of the catalyst. The catalyst 154 is positioned along the exhaust system some distance from the engine 22, and yet not so far therefrom that condensation of liquids occurs on the catalyst or water flows backwardly through the exhaust system into the catalyst.

In addition, and as clearly illustrated in FIG. 3, the expansion pipe 150 in which the catalyst 154 is positioned extends through the "V" shaped valley between the cylinder block 80 and head 82 of the engine 22 and the intake or induction system, including the carburetor 108 (i.e. as illustrated, the expansion pipe 150 extends along a side of the centerline C towards the vertical line V). This allows the engine 22 to retain a low profile.

Also, since the exhaust manifold 142 extends towards the front of the engine 22 and then the expansion pipe 150 extends therefrom along the engine to its rear end, exhaust pipe length from the engine to the catalyst is of the desired length.

Means are provided for controlling the flow of exhaust gases through the exhaust passages 140 from the combustion chambers 84. Preferably, this means comprises an exhaust control device 176. The exhaust control device 176 comprises a sliding knife type valve 178 and means for moving the valve.

Figure 8:
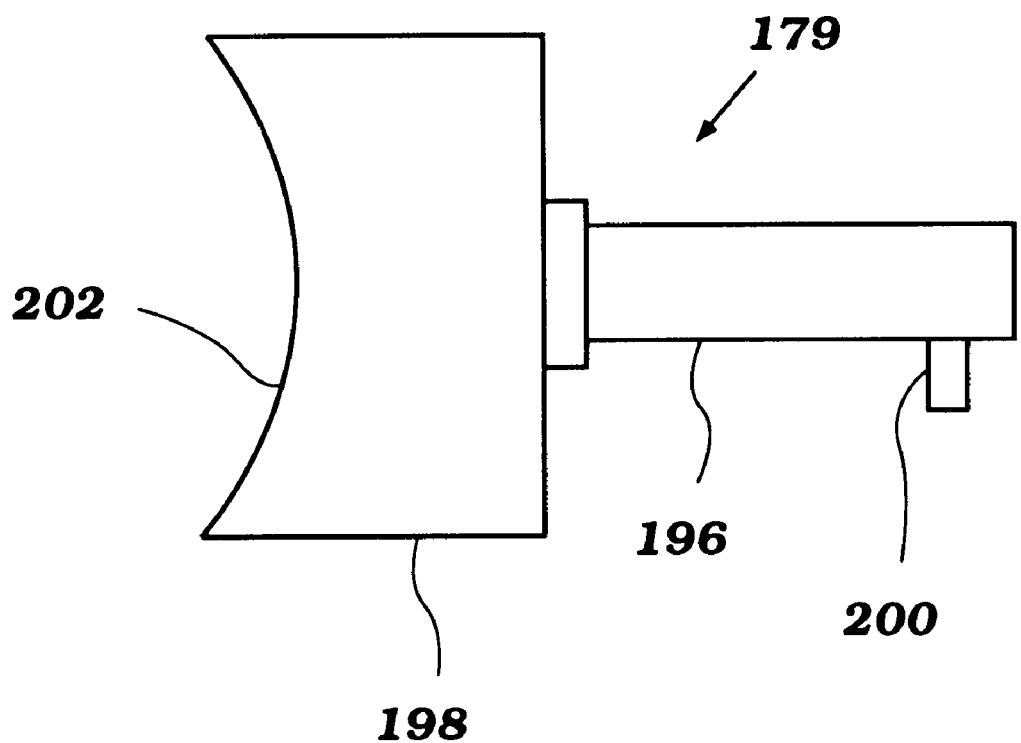
FIG. 8 is a side view of a valve body of the exhaust control illustrated in FIG. 7.

As illustrated in FIG. 8, the valve 178 has a body 179 with an elongate stem 196 with a plate 198 connected at one end and a pin 200 at the other. The plate 198 is flat, and includes a generally circular cut-out edge 202 opposite the stem 196. The edge 202 is shaped such that when the body 179 valve 178 is retracted, the edge 202 cooperates with the cylinder block 80 to define a smooth exhaust passage 140.

Figure 7:
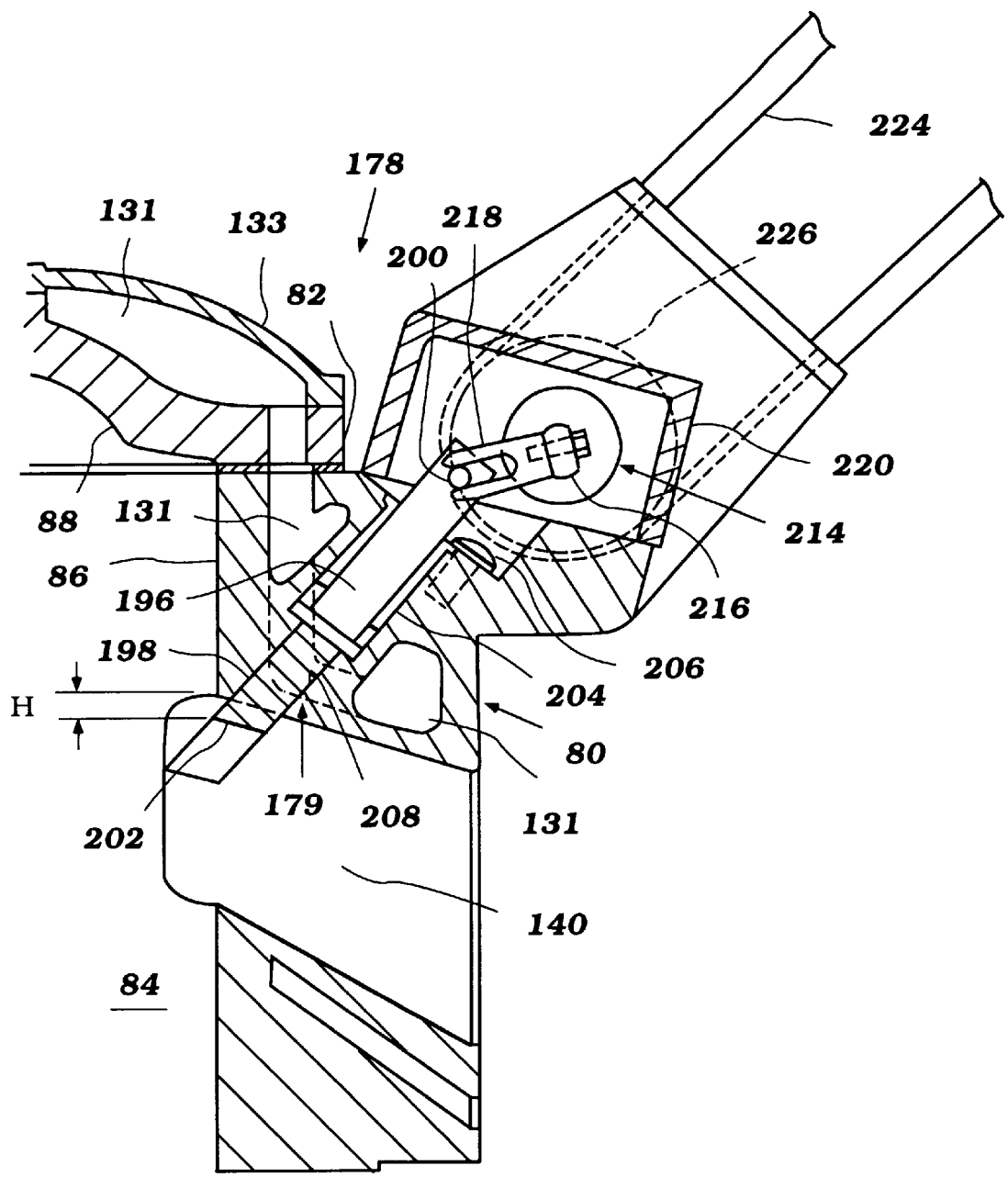
FIG. 7 is a partial cross-sectional view of the engine illustrated in FIG. 3, illustrating an exhaust control in accordance with the present invention.

As illustrated in FIG. 7, the valve 178 is mounted to the block 80. In particular, a guide or passage 208 extends through the block 80 from a top side adjacent the cylinder head 82 into the exhaust chamber 140. The passage includes a narrow portion adjacent the passage 140 in which the plate 196 of the body 179 of the valve 178 is positioned. The passage includes an adjacent enlarged section extending inwardly from the top of the block 80 in which a sleeve bearing 204 is positioned. The sleeve bearing 204 is maintained in position by one or more bolts 206 or similar fasteners. The bearing 204 is sized to slidably accept the stem portion 196 of the body 179 valve 178.

So arranged, the body 179 of the valve 178 is moveable between a first position and a second position. In a first position, the body of the valve 178 is moved downwardly so that the plate 198 extends into the exhaust passage 140 (in FIG. 7, this distance is illustrated as "H" although it may be greater, as illustrated by the positioned of the valve body 179 in phantom) partially blocking it. This has the effect of delaying the time the exhaust starts to pass from the combustion chamber 84 to the exhaust passage 140 (as the piston 90 moves downwardly from top dead center) and has the effect of causing the exhaust to stop flowing earlier (as the piston 90 moves upwardly) as compared to the second position of the valve 178. In the second position, the body 179 (namely the plate 198a) of the valve 178 does not obscure, or at least obscures less as compared to its first position, of the passage 140. In this position, the exhaust flow starts earlier and lasts longer.

As state above, the valve 178 includes means for moving the body 179 between its first and second positions. Preferably, this means comprises an actuating device in the form of a motor 210. In the preferred embodiment of the invention, the motor 210 is mounted remote from the valve body 179, and as such, the means for moving includes a transmission mechanism 211 (see FIG. 3) for transmitting movement of the actuator to the valve 178.

The motor 210 is preferably mounted to an upwardly extending wall section 212 of the hull 26, as illustrated in FIG. 3. Preferably at least this section of the hull 26 comprises a reinforced fiber resin material, so as to serve as a vibration insulator. So as to be readily accessible, the motor 210 is mounted adjacent the opening 60 below the front seat 36. In addition, the motor 210 is positioned near the top of the wall 212 so that in the event water enters the engine compartment 54, the motor 210 is positioned above the water level.

The transmission mechanism 211 includes a shaft 214 mounted for rotation with respect to the cylinder block 80. A shaft 214 extends inwardly from a rear end of the block 80, and a shaft 215 extends inwardly from a front end of the block 80. Each shaft 214,215 has connecting part 216 extending from its end opposite the end of the block 80. The connecting part 216 extends parallel to the shaft 214,215.

An arm 218 extends from the connecting part 216 generally perpendicular thereto. The arm 218 has a slot for accepting the pin 200 extending from the top end of the stem 196. Preferably, each shaft 214,215 is mounted under a cover 220 connected to the top of the block 80.

In addition, and as best illustrated in FIGS. 3, 5 and 7, the transmission mechanism 211 includes a looping cable 224 extending around a motor pulley 222 positioned on an output shaft of the motor and a follower pulley 226 mounted on the end of the shaft 214 corresponding to the valve closest the rear end of the engine 22.

A drive pulley 228 is preferably mounted adjacent the follower pulley 226 on the same shaft 214. A follower pulley 230 is mounted on the other shaft 215 (corresponding to the other cylinder) and a looping cable 232 extends between the drive pulley 228 and the follower pulley 232.

The transmission mechanism 211 is arranged so that if the motor 210 moves the pulley 222 in a first direction, the cable 224 moves in the same direction, rotation the follower pulley 226. Rotation of the follower pulley 226 causes the shaft 214a to rotate, and the arm 218 to move the pin 200 of the valve 278, and thus the connected valve plate 196. At the same time, when that shaft 214 moves, the drive pulley 228 thereon rotates, causing the cable 232 to rotate. This, in turn, causes the follower pulley 230 on the other shaft 215 to move, causing the valve body 179 to move as described above. Of course, if the motor 210 causes the drive pulley 222 to move in the opposite direction, the valve plates 196 are moved in the opposite direction as well. In this manner, the valve plates 196 are moved between their first and second positions.

A motor control, such as an engine control unit (ECU) is provided for controlling the motor 210 in an appropriate manner so as to control the movement of the valves 178 in relation to the engine speed and load and other characteristics of the engine.

Notably, the transmission mechanism 211 is arranged so that watercraft vibration and hull distortion does not affect the valve actuation. In particular, the slight resiliency of the cables 224,232 and their flexibility serves to prevent vibrations from being transmitted to the motor 210 from the engine 22, or from the watercraft 20 to the engine 22.

As illustrated, the motor 210 is preferably mounted on that side of the hull 26 towards which the engine leans. In this manner, the transmission mechanism spans a short distance, so that only a short cable is necessary. This improves the response between the actuator (motor) and the valve body.

In addition, in order to reduce the transmission of vibrations from the watercraft to the motor 210, the entire hull 26, or preferably at least that portion of the hull to which the motor 210 is mounted, comprises a fiber reinforced resin material. It is also contemplated that other vibration isolating apparatus may be utilized, such as a rubber pad positioned between the motor and the hull.

While this particular valve arrangement is preferable, it is contemplated that other means for controlling the flow of exhaust from the combustion chambers may be utilized, as known to those skilled in the art.

Figure 9:
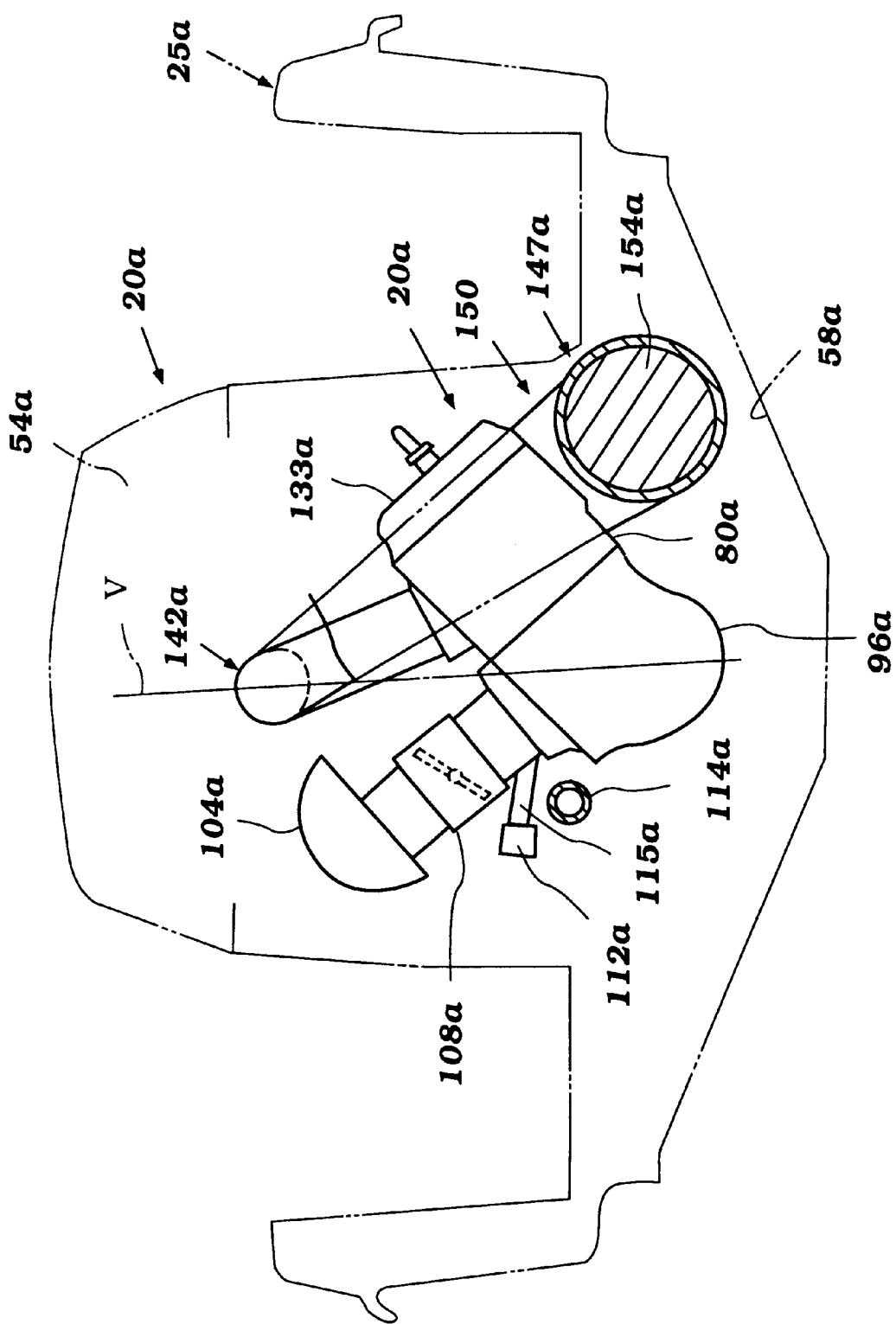
FIG. 9 is a cross-sectional end view of a watercraft similar to that illustrated in FIG. 3, illustrating an engine with an exhaust control in accordance with a second embodiment of the present invention.

FIG. 9 illustrates a second embodiment of the present invention in which an alternative exhaust control is employed. In the description and illustration of this embodiment of the invention, like parts have been given like numerals to those utilized in describing and illustrating the embodiment above, except that an "a" designator has been added thereto.

As illustrated in FIG. 9, the engine 22a is arranged so that the exhaust manifold 142a is positioned in the valley between the cylinder block 80a and the intake system (including a silencer 104a, and a carburetor 108a having an inlet fuel line 112a leading to an injector 115a) of the engine. The manifold 142a extends around the front of the engine 22a to an expansion pipe 150a. As illustrated, the expansion pipe 150a extends below the engine (i.e. between the centerline C and the bottom 58a of the hull) from the front end to the rear end thereof (and on to the exhaust pipe portion). As in the embodiment described above, a catalyst 154a is positioned in the expansion pipe 150a.

This arrangement has the advantage that the substantial heat emanating from the expansion pipe 150a is not transmitted directly to the seats of the watercraft, since the expansion pipe 150*a* is positioned under the tilted side of the engine 22*a*. At the same time, the exhaust system is arranged so that the engine profile remains low. In addition, the catalyst 154*a* remains in its advantageous position along the exhaust system some distance from the engine. The expansion pipe 150*a* is preferably mounted to the engine 22*a* in similar fashion to that described above so that vibration of the catalyst 154*a* is reduced.

Of course, the foregoing description is that of preferred embodiments of the invention, and various changes and modifications may be made without departing from the spirit and scope of the invention, as defined by the appended claims.

What is claimed is:

1. An exhaust control system for a watercraft powered by an internal combustion engine, the watercraft having a hull, said engine mounted to said hull and having at least one combustion chamber with an exhaust passage leading therefrom, said exhaust control system including an exhaust manifold connected to said engine and having a passage leading therethrough from said exhaust passage, an exhaust pipe connected to said exhaust manifold and having a passage therethrough in communication with said exhaust passage through said exhaust manifold for routing exhaust from said engine to an exhaust gas discharge of the watercraft, said exhaust pipe having a catalyst therein and means for rigidly affixing the portion of said exhaust pipe containing said catalyst directly to said engine.

2. The exhaust control system in accordance with claim 1, wherein said exhaust pipe lies on a side of said engine opposite to saoid exhaust manifold.

3. The exhaust control system in accordance with claim 1, wherein said exhaust pipe comprises an expansion pipe.

4. The exhaust control system in accordance with claim 2, wherein said exhaust pipe extends generally parallel to a length of said engine from a front end to a rear end thereof and is connected at one of said ends to said exhaust manifold by a flexible coupling.

5. The exhaust control system in accordance with claim 1, wherein said combustion chamber has a centerline offset from a vertical line, and said exhaust pipe extends along said engine on a side of said centerline closest said vertical line.

6. The exhaust control system in accordance with claim 5, wherein said engine includes an intake system positioned on a side of said vertical line opposite said centerline, whereby said intake system and a remainder of said engine form a valley, and wherein said exhaust pipe extends through said valley.

7. The exhaust control system in accordance with claim 2, wherein said exhaust manifold extends around one end of said engine to said exhaust pipe, and said exhaust pipe extends therefrom along said engine to the other end thereof said catalyst being juxtaposed to said other end and said rigid connection of said exhaust pipe to said engine being juxtaposed to said other end.

8. The exhaust control system in accordance with claim 1, wherein said combustion chamber of said engine has a centerline offset from a vertical line in a first direction, said exhaust manifold is connected to a top of said engine and said exhaust pipe is positioned in said first direction from said centerline and extends along said engine.

9. The exhaust control system in accordance with claim 1, wherein said exhaust pipe is rigidly connected to said engine with at least one bracket.

10. The exhaust control system in accordance with claim 9, wherein said exhaust pipe has at least one lower bracket extending therefrom connected to said engine and at least one upper bracket extending therefrom connected to said engine.

11. The exhaust control system in accordance with claim 10, wherein said lower bracket is connected to a cylinder block of said engine and said upper bracket is connected to a cylinder head cover of said engine.

* * * * *